United States Patent [19]
Cone

[11] Patent Number: 4,641,091
[45] Date of Patent: Feb. 3, 1987

[54] DEVICE FOR TESTING AND CALIBRATING TREASURE HUNTING METAL DETECTORS

[76] Inventor: Ivan H. Cone, 845 Palmer Blvd., Fortuna, Calif. 95540

[21] Appl. No.: 650,699

[22] Filed: Sep. 17, 1984

[51] Int. Cl.$^4$ ...................... G01R 35/00; G01V 13/00
[52] U.S. Cl. .................................... 324/202; 324/326; 73/1 R
[58] Field of Search ........................ 324/202, 326–329; 73/1 R

[56] References Cited
U.S. PATENT DOCUMENTS
2,874,349 2/1959 Staats ................................... 324/202

Primary Examiner—Ernest F. Karlsen
Assistant Examiner—Walter E. Snow
Attorney, Agent, or Firm—Norman E. Reitz

[57] ABSTRACT

A device for testing and calibrating treasure hunting metal detectors is provided. The device includes an enclosure which contains a quantity of background material of the type expected to be encountered in the search environment of the metal detector. Elongated cross members are positioned across the housing at varying distances from the top. Each cross member has an open interior region into which a slide containing a simulated metal treasure may be placed. When the search coil of a metal detector is placed on top of the device it senses the presence of the metal treasures in the slides within particular ones of the cross members. By varying the type of metal and the location of the simulated metal targets the capabilities of the treasure hunting metal detector can be tested and calibrated.

6 Claims, 6 Drawing Figures

DEVICE FOR TESTING AND CALIBRATING TREASURE HUNTING METAL DETECTORS

This invention relates to a device for testing and calibrating treasure hunting metal detectors and, more particularly, relates to a device which positions metal targets of selected composition and size at varying distances from a treasure hunting metal detector to permit the capability of the detector to be tested.

Metal detectors are widely used in industrial, commercial and treasure hunting applications. They are used to detect the presence of metal objects or metal-bearing ores in environments in which they might not be visually detectable or in which they might not be detectable by other means. For example, the metal object may be concealed in clothing, enclosed in luggage, buried in the ground, or may be found lying at the bottom of a body of water, or otherwise hidden from view or shielded from reach. Metal detectors may be positioned in a fixed location or may be portable. Metal detectors are most often portable since they must be able to scan countless locations to determine if, in fact, metal objects are present.

Practicable metal detectors function on the principle of transmitting a signal of specified frequency which is somehow disturbed by the presence of metal objects. The disturbed signal is detected and the location and other attributes of the metal object are inferred from the nature of the detected signal. The induction balance detector, for example, detects changes in the field pattern due to the presence of the metal object. A beat frequency detector, on the other hand, compares the frequency of the received signal with a reference frequency and measures the difference to determine a beat frequency. The value of the beat frequency determines the location of the hidden metal object. For discussion of the specific technologies on which metal detectors are based see, E. S. LaGaye, "Electronic Metal Detector Hand-Book", (1969), Western Heritage Press, particularly chapters 3 & 6; and C. Garrett, "Modern Metal Detectors", (1984).

It is property of metal detectors that they are able to detect not only the presence of metal objects, but also the approximate size of the object and/or the distance of the object from the detector. Such information is especially useful when it is desired to retrieve the object from its hidden location. Thus, for, example in treasure hunting applications it is possible to estimate with reasonable precision the depth of the object beneath the ground. It is also desirable to be able to discriminate between objects of small value, ie. pull tabs from aluminum beverage cans, and objects of high value, ie. gold nuggets. It has been found, however, that in practice the readings obtained from metal detectors are not always reliable due to differences in location, in the composition of background materials in the search field and to electrical drift in the instrument itself. Therefore, it is highly desirable to be able to test the capabilities of a given metal detector so that it can be calibrated and thereafter provide reliable readings. It is especially desirable that testing and calibration be carried out in the field.

Prior art devices for testing metal detectors have been complex and have employed fixed distances between the detector and the simulated metal target. For example, in R. M. Kaye, et al., "Apparatus for Testing Metal Detectors" U.S. Pat. No. 4,144,486, an apparatus is disclosed which utilizes a variable voltage power supply to drive the electronic circuitry in a metal detector. The voltage level required to produce a given signal response is used to infer the distance of the metal target from the metal detector. A fixed configuration for the arrangement of the simulator target and metal detector is utilized. See also W. Greer, et al, "Calibration Apparatus and Method for Eddy Curent Phase Sensitive Selector", U.S. Pat. No. 3,326,976; and G. A. Eilod, "Method for Testing Metal Detectors", U.S. Pat. No. 4,288,748. This type of apparatus does not readily allow a detector to be tested for its ability to discriminate between targets of different sizes or composition.

It is therefore an object of the present invention to provide a device for testing and calibrating treasure hunting metal detectors.

It is another object of the present invention to provide a testing device for metal detectors which permits a target of selected composition and size to be positioned at varying distances from the detector being tested.

It is an additional object of the present invention to provide a test device for metal detectors which permits discrimination between target metals of varying composition.

It is a further object of the present invention to provide a test device for metal detectors which will permit the distance of the detector to a simulated metal target to be determined with precision so that the detector can be calibrated.

BRIEF DESCRIPTION OF THE DRAWINGS

For a more complete understanding of the device of the present invention reference may be had to accompanying drawings which are incorporated herein by reference and in which.

SUMMARY OF THE INVENTION

A device for testing and calibrating treasure hunting metal detectors is provided. The device comprises an enclosure which contains a quantity of material of the type expected to be encountered in the search environment of the detector. At least one elongated cross member is positioned across the housing and extends to a side of the enclosure. The cross member has an open interior region into which a slide containing a simulated target may be placed. When the search coil of a metal detectr is placed on top of the device it will sense the presence of a metal target within the slide which is positioned within a particular one of the cross members. By varying the type of metal and the location of simulated metal targets the capabilities of the metal detector can be tested and calibrated.

DESCRIPTION OF THE PREFERRED EMBODIMENT

Treasure hunters seek for buried treasure in out of the way locations. They may search in abandoned living quarters, burial sites, in public parks or wherever it might be expected that metal objects of monetary value or historical interest may be found. They will pick a metal detector based on the technology which they believe to be best for the conditions of the search. It is often the case, however, that the exact conditions of the search are not known in advance. Thus, it is desirable to be able to test the device in the field or in a manner to best simulate the actual conditions of search. The results of the test may be used to set null points on readout meters or to allow mental corrections to be made to readouts that are subseqently obtained in the field.

Figure 1A:
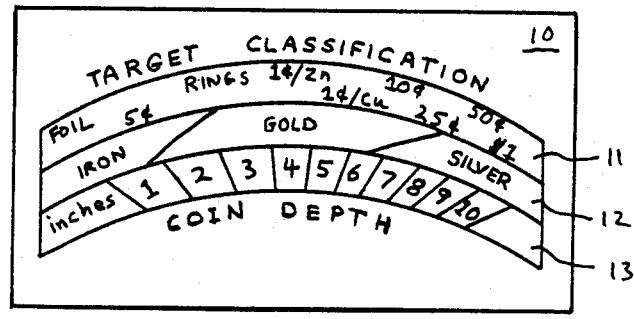
FIG. 1A is a front view of the readout panel of a conventional metal detector.

The device of the present invention permits the testing and calibration of portable metal detectors of the type having a circular search coil connected by an extension probe to a handle and to control electronics. Such detectors are manufactured by various companies and are widely available. Examples are the Garrett Master Hunter 7 A.D.S. available from Garrett Metal Detectors, 2814 National Drive, Garland Tex. 5041; and the White Series 3 Metal Detectors, available from White's Electronics, Inc., 1011 Pleasant Valley Rd., Sweet Home, Oreg. 97386. The tests that are relevant for detectors of this type are the true distance from the search coil to the target and the general identification of the composition of the target. These are values that are provided on readout meters of modern metal detectors. For example, in FIG. 1A the meter 10 signifies a depth (search coil to target) for coins in scale 13, shows a likely identification of the metal type in scale 12 and suggests the source of the signal in scale 11. Readouts are produced by a pointer (not shown). The scales are selected by a switch located in control electronics 30, shown in FIG. 1.

In order to test the capability of the metal detector so that the readout on meter 10 can be calibrated, the device 15 of the present invention is provided, as shown in FIGS. 1-4. The device 15 consists of an enclosure 31 which has a plurality of hollow elongated cross members 18, 19 . . . 23 which extend from one side to the other, as shown particularly in FIG. 4. Enclosure 31 is shown to contain sand 32 everywhere except within the interior of the hollow, elongated cross members. The sand will simulate the search environment when metal objects are sought on a beach. Enclosure 31 can be emptied of sand 32 and filled with dirt, alluvium, pebbles, water or any other material which could be encountered in the search environment. As a result, the effect on the electromagnetic search field emanating from the search coil 28 during a test will be approximately that experienced during an actual search.

The search coil 28 of metal detector 27 is placed on the sand 32 within enclosure 31 or is placed on top of cover 16 which may be used to cover enclosure 31. In the first instance the search coil has no intervening air column thereby simulating a stationary search of a particular sandy site. In the latter instance the search coil rests 1"-3" above the surface of the sand thereby simulating a sweep over a sandy surface. The probe extensions 26 which terminates in handle 29 and carries electronic controls 30 will extend upwardly; probe extension 26 or handle 29 may be held by operator or may be rested against support bar 24 which is preferably angled or off center to allow probe extension 26 to rest against it by the force of gravity. Support bar 24 is attached to enclosure 31 by fasteners (not shown). In one embodiment a clasp (not shown) is affixed to the upper end of support bar 24 so that the probe extension 26 may be positively held while metal detector 27 is being tested. The electronic controls 30 are connected to search coil 28 by means of coiled wire 25. Probe extension 26 is pivotally connected to search oil 28 by swivel joint 17.

Figure 1:
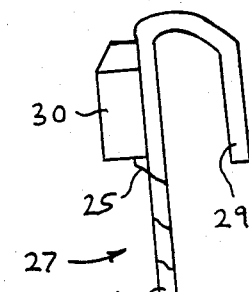
FIG. 1 is a perspective view of the device of the present invention with a treasure hunting metal detector in the test position.
Figure 1:
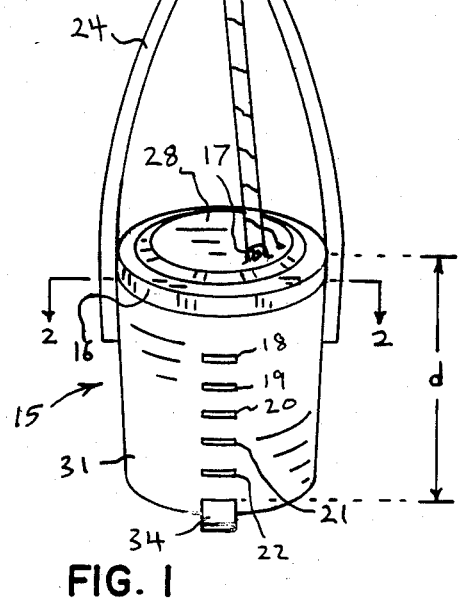
Figure 2:
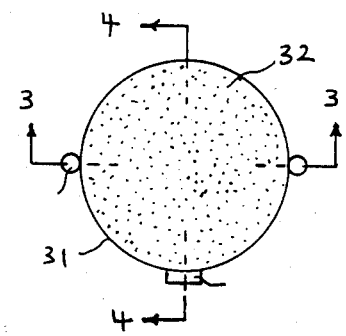
FIG. 2 is a partial plan view of the present invention as shown in FIG. 1 taken through lines 2—2.
Figure 3:
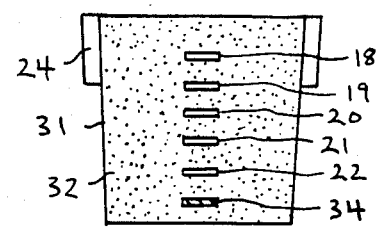
FIG. 3 is a cross sectional view of the present invention taken through lines 3—3 in FIG. 2.
Figure 5:
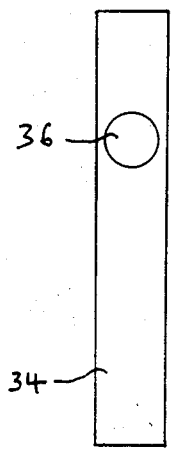
FIG. 5 is a plan view of a slide for inserting a simulated metal target into the various channels incorporated in the device.
Figure 4:
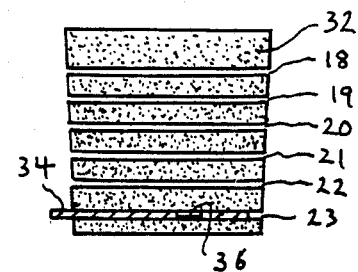
FIG. 4 is a slide cross sectional view of the present invention taken through lines 4—4 of FIG. 2.

Metal detector 27 is tested in the following manner. The detector 27 is placed on device 15 as shown in FIG. 1. A slide 34 shown in enlarged plan view in FIG. 5, has a metal target such as a coin placed in an indentation 36. Slide 34 containing a coin in indentation 36 is slid into one of the slots, e.g. slot 23 as shown in FIGS. 1-4. These slots are formed within each of elongated cross members 18, 19 . . . 23. A reading is taken on meter 10. Since the distance, d, between the search coil 18 on the cover 16 of enclosure 31 and slot 23 is known the accuracy of the reading can be tested. A null knob can be adjusted or the discrepancy noted. As the test is repeated for the other slots the pointer on the meter can be nulled to give precise readings or a calibrating curve can be drawn up or mentally noted. It is preferred that the various distances have values that coincide with the notations on the scales of the most common metal detectors. In another embodiment, the level of cover 16 is mannually adjustable so that the coil-to-target distances may be brought into correspondence wth the scales of these common metal detectors.

The ability of metal detector 27 to discriminated between material of different composition is tested by changing the value of the coin or the type of metal object held in slide 34. Thus, the silver setting on scale 12 can be tested by utilizing silver dollars or 50 cent pieces; the iron setting can be tested by utilizing nickels and the gold setting can be tested by utilizing wedding bands or like objects of jewelry. Variations or ambiguous readings can be noted and put to use when making interpretations of readings taken in the field.

In operating the device 15 of the present invention it may be useful to utilize more than one slide at a time. For example, a gold-containing slide 34 could be placed in lower slot 23 and an aluminum-containing slide 34' could be placed in upper slot 19. The treasure hunter could then gain experience in interpreting mixed results. Or, soil of a particular composition could be placed in the bottom of enclosure 31 and soil of another composition could be placed in the upper region of enclosure 31. Thus, it can be seen that innumerable combinations can be contrived for search environment, target location, target composition and size.

I claim:

1. A device for testing and calibrating a treasure hunting metal detector, comprising:

an enclosure;

a quantity of material of composition of the background material to be encountered in the search environment of said treasure hunting metal detector, said material being contained within said enclosure;

a plurality of cross members, each of said plurality of cross members extending from a side of said enclosure into said enclosure, each of said plurality of cross members forming an open slot within the interior region of said enclosure and being surrounded by said quantity of material; and a plurality of slide members adapted to slide within said slots formed within said plurality of cross members, each of said slide members having a means of carrying a simulated metal treasure.

2. A device for testing and calibrating a treasure hunting metal detector in accordance with claim 1 in combination with cover means, said cover means serving to cover the top of the said enclosure and to support the search coil of said metal detector during a test.

3. A device for testing and calibrating a treasure hunting metal detector in accordance with claim 2 in combination with support means to support an extension probe, electronic controls and handle of said metal detector during test and calibration.

4. A device for testing and calibrating treasure hunting metal detectors in accordance with claim 3 wherein the intervals between said cross members correspond with depth settings on the readout meter of said metal detector.

5. A device for testing and calibrating a treasure hunting metal detector in accordance with claim 4 wherein each of said plurality of slides has an indentation shaped to hold a coin.

6. A device for testing and calibrating a treasure hunting metal detector in accordance with claim 5 wherein said material is water and wherein said plurality of elongated cross members are of integral fabrication to be waterproof whereby said slides are not brought in contact with said quantity of water.

* * * * *